United States Patent
O'Connor et al.

(10) Patent No.: US 8,726,139 B2
(45) Date of Patent: May 13, 2014

(54) UNIFIED DATA MASKING, DATA POISONING, AND DATA BUS INVERSION SIGNALING

(75) Inventors: James O'Connor, Austin, TX (US); Aaron Nygren, Truckee, CA (US); Anwar Kashem, Cambridge, MA (US); Warren Fritz Kruger, Sunnyvale, CA (US); Bryan Black, Spicewood, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 202 days.

(21) Appl. No.: 13/325,648

(22) Filed: Dec. 14, 2011

(65) Prior Publication Data

US 2013/0159818 A1    Jun. 20, 2013

(51) Int. Cl.
| | |
|---|---|
| G06F 11/00 | (2006.01) |
| H03M 13/00 | (2006.01) |
| G11C 29/00 | (2006.01) |
| G06F 5/00 | (2006.01) |
| G06F 13/00 | (2006.01) |
| G06F 13/42 | (2006.01) |
| H03K 19/20 | (2006.01) |
| H03K 19/00 | (2006.01) |

(52) U.S. Cl.
USPC ........... 714/799; 714/718; 714/763; 714/774; 710/49; 710/100; 710/105; 711/154; 326/51; 326/52; 326/93

(58) Field of Classification Search
USPC ............ 714/718, 799, 763, 774; 710/49, 100, 710/105; 711/154; 326/51, 52, 93
See application file for complete search history.

(56) References Cited

U.S. PATENT DOCUMENTS

| | | | | |
|---|---|---|---|---|
| 6,898,648 | B2 * | 5/2005 | LaBerge | 710/100 |
| 7,139,852 | B2 * | 11/2006 | LaBerge | 710/100 |
| 8,223,042 | B2 * | 7/2012 | Abbasfar | 341/63 |
| 8,260,992 | B2 * | 9/2012 | Dearth et al. | 710/117 |
| 8,341,470 | B2 * | 12/2012 | Moon | 714/719 |
| 8,363,707 | B2 * | 1/2013 | Hollis | 375/222 |
| 8,495,437 | B2 * | 7/2013 | Sohn et al. | 714/718 |
| 8,498,344 | B2 * | 7/2013 | Wilson et al. | 375/257 |
| 8,510,490 | B2 * | 8/2013 | Abbasfar | 710/105 |
| 2010/0030955 | A1 | 2/2010 | Lai | |
| 2010/0185897 | A1 | 7/2010 | Abts et al. | |
| 2011/0153939 | A1 * | 6/2011 | Choi | 711/118 |
| 2013/0061006 | A1 * | 3/2013 | Hein | 711/154 |
| 2013/0128994 | A1 * | 5/2013 | Hollis | 375/259 |

FOREIGN PATENT DOCUMENTS

WO    WO 2011/008394 A2    1/2011

OTHER PUBLICATIONS

International Search Report and Written Opinion for International Application No. PCT/US2012/069541, European Patent Office, Netherlands, mailed on Mar. 7, 2013.

* cited by examiner

*Primary Examiner* — John J Tabone, Jr.
(74) *Attorney, Agent, or Firm* — Sterne, Kessler, Goldstein & Fox P.L.L.C.

(57) ABSTRACT

Provided herein is a method and system for providing and analyzing unified data signaling that includes setting, or analyzing a state of a single indicator signal, generating or analyzing a data pattern of a plurality of data bits, and signal, or determine, based on the state of the single indicator signal and the pattern of the plurality of data bits, that data bus inversion has been applied to the plurality of data bits or that the plurality of data bits is poisoned.

16 Claims, 7 Drawing Sheets

UNIFIED DATA MASKING, DATA POISONING, AND DATA BUS INVERSION SIGNALING

BACKGROUND OF THE INVENTION

1. Field of the Invention

The present invention is generally directed to high speed memory systems. More particularly, the present invention is directed to improved signaling of data status within a computing system.

2. Background Art

A data bus is susceptible to cross talk, simultaneous switching noise, inter symbol interference, and draws power based on the state of the data and/or frequency of data transition. One way to reduce these adverse effects and to prevent unnecessary power consumption is to encode the data. One specific form of data encoding that can be used is data bus inversion (DBI).

Implementation of DBI includes encoding circuitry at the transmitter that assesses the relationship between data bits to be transmitted across a data bus and then decides (based on a particular DBI algorithm) if it would be advantageous to invert some or all of the data bits prior to transmission. If the data bits are inverted, an additional signal, referred to as a DBI bit, is also set at the encoding circuitry to indicate that the data bits are inverted. Typically, an extra channel is needed so that the DBI bit may be transmitted in parallel with the data bits to inform the receiving circuitry which groups of data bits have been inverted. A receiver then uses the DBI bit in conjunction with decoding circuitry to return the incoming group of data bits to their original state.

Another form of status signaling is used in conjunction with dynamic random access memory (DRAM). DRAMs may be used for the main memory of a computer system, and also may be used in graphics applications. DRAMs may include a data masking function to mask data that is input via data input and output pins (typically called "DQ pins") from an external source. Data masking generally is performed in units of a single byte and is signaled through the use of a data masking bit or line. For example, in the case of a synchronous DRAM having a data path width of 16 bits, there are generally two data masking pins (typically called "DQM pins") from which data masking signals are input. These DQM pins comprise a lower DQM (LDQM) pin and an upper DQM (UDQM) pin. The UDQM pin masks data input via data input and output pins DQ0 through DQ7, e.g., the lower 8 bits of 16 bits that are input via 16 data input and output pins DQ1 through DQ15. The UDQM pin masks the upper 8 bits, data input via data input and output pins DQ8 through DQ15 where pins include any input/output structure for an integrated circuit (IC) device and can include pads, optical input/output structures and other conventional input/output structures.

Therefore, an IC memory device can include multiple pins, or lines, that indicate the status of data on a data bus, e.g., DBI and/or masking. Such a device may also use a single control line to indicate the status of a data bus, but utilize multiple clock cycles to convey multiple status states that are associated with the data.

SUMMARY OF EMBODIMENTS OF THE INVENTION

What is needed, therefore, is an improved method and system to signal multiple bus states in minimal time using the least number of signaling lines.

Embodiments of the disclosed invention, in certain circumstances, provide a method of generating unified data signaling that includes setting a state of a single indicator signal and generating a data pattern in a plurality of data bits. Then, based on the state of the single indicator signal and the pattern of the plurality of data bits, the method signals that data bus inversion has been applied to the plurality of data bits, Whether masking was applied, or if the data bye is poisoned.

An embodiment of the disclosed invention provides a method of receiving a unified data signal that includes analyzing a state of a single indicator signal and analyzing a data pattern, of a plurality of data bits. Then, based on the state of the single indicator signal and the pattern of the plurality of data bits, the method determines that data bus inversion has been applied to the plurality of data hits, Whether masking was applied, or if the data bye is poisoned.

Another embodiment of the disclosed invention provides a system that includes a memory device and a processing unit coupled to the memory device that sets a state of a single indicator signal and generates a data pattern in a plurality of data bits. Then, based on the state of the single indicator signal and the pattern of the plurality of data bits, the system signals that data bus inversion has been applied to the plurality of data bits, whether masking was applied, or if the data bye is poisoned.

Yet another embodiment of the disclosed invention provides a system that includes a memory device and a processing unit coupled to the memory device that analyzes a state of a single indicator signal and analyzes a data pattern of a plurality of data bits. Then, based on the analysis of the state of the single indicator signal and the pattern of the plurality of data bits, the system determines that data bus inversion has been applied to the plurality of data bits, Whether masking was applied, or if the data bye is poisoned.

An additional embodiment of the disclosed invention provides a computer program product, that, in response to execution by a computing device, causes the computing device to perform operations that include setting a state of a single indicator signal and generating a data pattern in a plurality of data bits. Then, based on the state of the single indicator signal and the pattern of the plurality of data bits, signals whether data bus inversion has been applied to the plurality of data bits, whether masking was applied, or if the data bye is poisoned.

Additional features and advantages of the invention, as well as the structure and operation of various embodiments of the invention, are described in detail below with reference to the accompanying drawings. It is intended that the invention not be limited to the specific embodiments described herein. Such embodiments are presented herein for illustrative purposes only. Additional embodiments will be apparent to persons skilled m the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, Wherein like reference numerals are used to refer to like elements throughout.

DETAILED DESCRIPTION OF EMBODIMENTS OF THE INVENTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or Characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forums "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

System Overview

Figure 1:
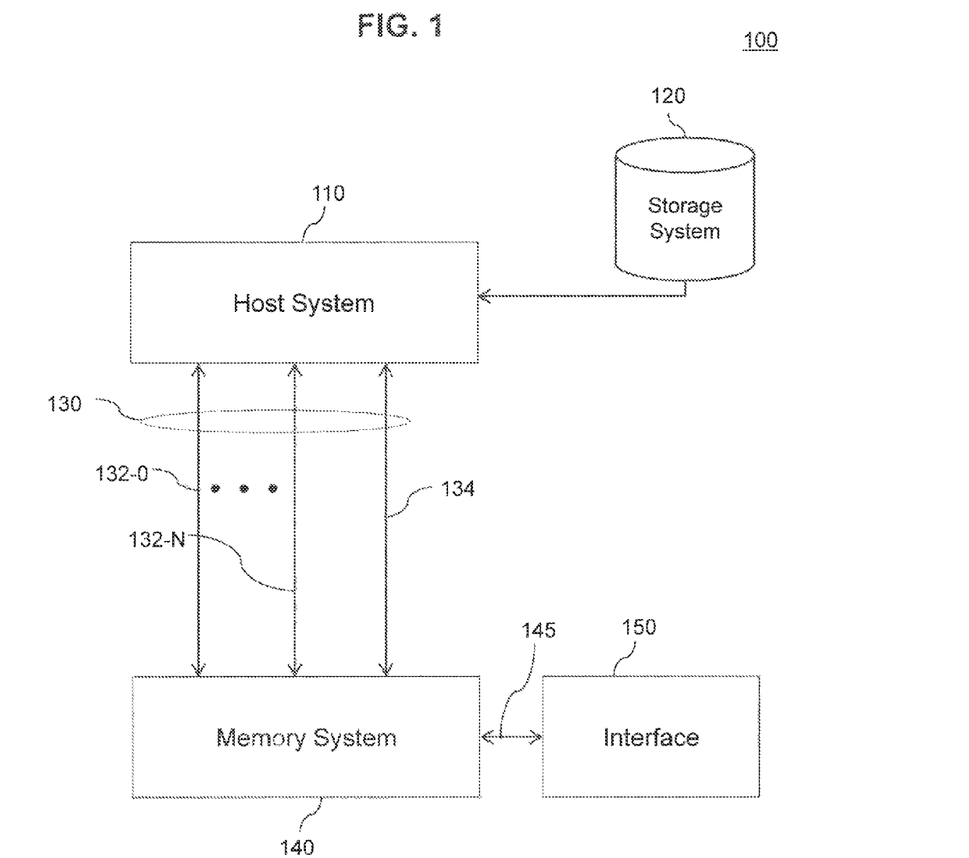
FIG. 1 is an illustrative block diagram of a memory access system, according to an embodiment of the present invention.

FIG. 1 is an illustration of a unified signaling system 100 including a host system 110, a storage system 120, and a data/command bus 130 that includes data bus lines 132-0 through 132-N and indicator line 134, a memory system 140, control lines 145 and an interface 150, according to an embodiment of the invention.

Memory system 140 contains high speed memory, such as stacked DRAM or graphics double data rate memory (GDDR), but can contain any type of memory technology. In an embodiment, memory system 140 contains logic for data bus inversion (DBI), as will be discussed in more detail later in this specification.

Host system 110 can access data from storage system 120 and perform reads and writes of data in memory system 140. In an embodiment, host system 110 accesses memory system 140 through multiple data lines, 132-0 through 132-N. The data carried on data lines 132-0 through 132-N can also be referred to as DQ signals, DQ byte, or DQ bits 0 through N. Host system 110 also monitors indicator line 134, which indicates, based on the state of an indicator signal present on indicator line 134, an attribute of the data present on data bus lines 132. Such an attribute includes that the data has been inverted, masked, or poisoned, as will be discussed in further detail.

Interface 150, through control lines 145, controls how the data on data bus lines 132 is to be processed, for example whether or not data bus inversion or data poisoning support is enabled. Based on input from interface 150, memory system 140 will perform various functions, such as examining the data on data bus lines 132 to ascertain if the data should be inverted when the input from interface 150 indicates data bus inversion is enabled.

As will be further discussed, there is one indicator signal present on indicator line 134 for each DQ byte present on data bus lines 132. The indicator signal is sampled along with the DQ signals for each read and write to or from memory system 140. For a given DQ byte, the state of the indicator signal in conjunction with special data patterns in the associated DQ byte can specify three special certain classes of data including that the data is inverted, masked, or poisoned.

Masked Data

Data masking provides byte granularity data masking during a write access to memory. The mask suppresses an update to the memory. The use of data masking is controlled by interface 150 and will be further explained in relationship to data bus inversion and poisoning.

Data Bus Inversion

DBI reduces the number of data signals that switch state (e.g., from low to high) on any given transfer of data, such as to and from memory system 150. If the number of data signals that switch states is minimized then the amount of necessary circuit power is reduced. This also improves signal integrity and generally reduces issues related to instantaneous current draw, e.g. di/dt, and also reduces noise due to state changes. DBI algorithms can limit the number of state changes to 50% of the data on the data bus. For example, for a DQ byte consisting of 8 bits/lines of data, the use of DBI can limit the number of changing states between two consecutive 8 bit DQ bytes to a maximum of 4 changing bits.

For example, assume that data bus inversion is enabled and a first DQ byte has the following pattern:
  01010101
and a second DQ byte has the following pattern:
  10101010.

In this example, without data bus inversion enabled, the state for every DQ bit will change, resulting in eight state changes. With data bus inversion enabled, a system, e.g., system 100, will determine that there are more than four state changes between the two consecutive DQ bytes and will invert the pattern of the second DQ byte as follows:
  01010101.
This inversion subsequently produces no state changes between the first and second DQ bytes. However, in order to signal that the data has been inverted in the second DQ byte an indicator signal associated with the second DQ byte must also be enabled, or driven to a "true" state (a true state is typically referred to as a "enabled," "high," or "1" in this specification, but can also be defined as an active low signal). Consequently, each DQ byte is also associated with its own indicator signal. Therefore, during any read or write of DQ data the indicator signal must also be sampled. Also, as used herein a DQ byte is not restricted to any particular number of bits. The use of 8 bits in the above example is merely an example and should not be construed as any type of restriction.

If DBI is disabled by interface 150 then any DBI signals over control lines 145 will not be asserted. Further, interface 150 can be configured to support either DBI-dc or DBI-ac modes.

DBI-DC for Unmasked Data

If DBI is disabled, then data is transmitted on data bus lines 132 and the indicator signal is disabled, or equivalently set to 0. If DBI-dc is enabled on interface 150, then each group of data signals, DQ byte, on data bus lines 132 and the indicator signal on indicator line 134 is examined each cycle. If 50% or more of the data signals on data bus lines 132 with a given indicator signal on indicator line 134 are driven high, then the indicator signal is enabled, or driven high, and the associated data signals on data bus lines 132 are inverted. Otherwise, indicator signal on indicator line 134 is disabled, driven low, and the associated data signals on data bus lines 132 are not inverted. As an example, given that the DQ byte consists of 8 bits, when five of the DQ bits are high, the indicator signal is driven high and the DQ bits are inverted resulting in three high DQ bits and one high indicator signal, for a total of four high signals.

DBI-AC for Unmasked Data

If DBI is disabled, then data is transmitted on data bus lines 132 and indicator signal is disabled, or equivalently set to 0. If DBI-ac is enabled on interface 150, then each group of data signals, DQ byte, on data bus lines 132 and indicator signal on indicator line 134 is examined each cycle. If 50% or more of the data signals on data bus lines 132 with a given indicator signal on indicator line 134 are to switch, e.g., the state of a DQ bit is to be driven to a different value than the signal held in the previous cycle, then the indicator signal is enabled, or driven high, and the associated data signals on data bus lines 132 are inverted. Otherwise, indicator signal on indicator line 134 is disabled, driven low, and the associated data signals on data bus lines 132 are not inverted. As an example, given that the DQ byte consists of 8 bits, when five of the DQ bits are to be switched, the indicator signal is driven high and the DQ bits are inverted resulting in three switched DQ bits and at most one switched indicator signal (if the previous indicator signal was not enabled), for a total switching of four signals.

DBI-DC for Masked Data

If DBI is disabled, masked data is specified by enabling indicator signal on indicator line 134, e.g. setting the indicator signal high, and the DQ signals are in a do not care state, preferably remaining unchanged from, the previous cycle for power saving purposes. If DBI-dc is enabled on interface 150, when host system 110 writes a masked plurality of data bits, e.g. the byte in question will not be written to memory, a special encoding is used where indicator signal on indicator line 134 is enabled, set high, and DQ bits on data bus lines 132 are set to the first half of the bits are set low and the second half of the bits are set high. For example, if there are eight bits in the DQ byte then the pattern can be shown as 00001111. This encoding does not occur for any regular or unmasked data patterns.

DBI-AC for Masked Data

If DBI is disabled, masked data is specified by enabling indicator signal on indicator line 134, e.g. setting the indicator signal high, and the DQ signals are in a do not care state, preferably remaining unchanged from the previous cycle for power saving purposes. If DBI-ac is enabled on interface 150, when host system 110 writes a masked data byte, e.g. the byte, or plurality of data bits, in question will not be written to memory, a special encoding is used where indicator signal on indicator line 134 is enabled, set high, and DQ bits on data bus lines 132 are set such that the first half of the bits are switched from their previous value. For example, if there are eight bits in the DQ byte then the pattern can be shown as 00001111 which is generated by exclusive ORing the previous DQ data on data bus lines 132 with the current DQ data on data bus lines 132. This encoding does not occur for any regular or unmasked data patterns.

Data Poisoning

Data poisoning is a system-level data integrity mechanism for storing data with uncorrectable errors. When the data is read back, the poisoned state is returned to the host system 110 and indicates that the host stored the previously unreliable data.

In many applications, host system 110 is likely to maintain error-correcting code (ECC)—protected write-back caches. In the event that a cache line suffers an uncorrectable error, this error may not be detected until the cache line is evicted. At this point, the data is corrupted, but the process that generated or requires this data may no longer be executing on host system 110. The desired behavior is to evict the corrupted data to memory and store the "poisoned state" of this data. Subsequent reads of this poisoned data from memory will signal an error to the process requesting this data.

In an example, in a DRAM implementation that supports parity in the data array, a write of data marked as poisoned causes the stored parity to be inverted. This behavior will cause an uncorrectable error on any subsequent read of this data.

In another example, a DRAM implementation that supports ECC in the data array, a write of data marked as poisoned causes the generated FCC bits to encode an uncorrectable error. This behavior will cause an uncorrectable error on any subsequent read of this data.

Unmasked writes to the entire protected word can reset the poisoned state, as the corrupted data has effectively been overwritten.

DBI for Unmasked Data with Data Poisoning Support Enabled

The behavior of the DBI signals for unmasked data is unchanged When data poisoning support is enabled. Thus, if DBI is disabled, then data is transmitted on data bus lines 132 and the indicator signal is disabled, or equivalently set to 0. If DBI-dc is enabled on interface 150, then each group of data signals on data bus lines 132 and the indicator signal on indicator line 134 is examined each cycle. If 50% or more of the data signals on data bus lines 132 with a given indicator signal on indicator line 134 are driven high, then the indicator signal is enabled, or driven high, and the associated data signals on data bus lines 132 are inverted. Otherwise, indicator signal on indicator line 134 is disabled, driven low, and the associated data signals on data bus lines 132 are not inverted. As an example, given that the DO byte consists of 8 bits, when five of the DO bits are high, the indicator signal is driven high and the DQ bits are inverted resulting in three high DQ bits and one high indicator signal, for a total of four high signals.

If DBI is disabled, then data is transmitted on data bus lines 132 and the indicator signal is disabled, or equivalently set to 0. If DBI-ac is enabled on interface 150, then each group of data signals on data bus lines 132 and indicator signal on indicator line 134 is examined each cycle. If 50% or more of the data signals on data bus lines 132 with a given indicator signal on indicator line 134 are to switch, e.g., the state of a DQ bit is to be driven to a different value than the signal held in the previous cycle, then the indicator signal is enabled, or driven high, and the associated data signals on data bus lines 132 are inverted. Otherwise, indicator signal on indicator line 134 is disabled, driven low, and the associated data signals on data bus lines 132 are not inverted. As an example, given that the DQ byte consists of 8 bits, when five of the DQ bits are to be switched, the indicator signal is driven high and the DQ bits are inverted resulting in three switched DQ bits and at most one switched indicator signal (if the previous indicator signal was not enabled), for a total switching of four signals.

Data Bus Inversion for Masked Data with Data Poisoning Support Enabled

When data poisoning support is enabled, the encodings of the DQ bits on data buss 132 are used to distinguish between masked and poisoned data.

If DBI is disabled, masked data is specified when indicator signal on indicator line 134 is enabled, set to 1, and a data pattern is present where the first half of the DO bits are set low and the second half of the bits are set high. If DBI-dc is enabled on interface 150, when host system 110 writes a masked data byte, e.g. the byte, or plurality of data bits, in question will not be written to memory, a special encoding is used where indicator signal on indicator line 134 is enabled, set high, and DQ bits on data bus lines 132 are set so that the first half of the bits are set low and the second half of the bits are set high. For example, if there are eight bits in the DQ byte then the pattern can be shown as 00001111. This encoding does not occur for any regular or unmasked data patterns.

If DBI-ac is enabled on interface 150, when host system 110 writes a masked data byte, e.g. the byte, or plurality of data bits, in question will not be written to memory, a special encoding is used where indicator signal on indicator line 134 is enabled, set high, and DO bits on data bus lines 132 are set such that the first half of the bits are switched from their previous value. For example, if there are eight bits in the DQ byte then the pattern can be shown as 00001111 which is generated by exclusive ORing the previous DQ data on data bus lines 132 with the current DQ data on data bus 132, This encoding does not occur for any regular or unmasked data patterns.

Data Bus Inversion for Unmasked Data with Data Poisoning Support Enabled

When DBI is disabled, poisoned data is indicated when the indicator signal on indicator line 134 enabled, set high, and a data pattern is present in the DQ byte where the first half of the DQ bits are set high and the second half of the bits are set low.

If DBI-dc is enabled on interface 150, when host system 110 writes a poisoned data byte, or plurality of data bits, a special encoding is used where indicator signal on indicator line 134 is enabled, set high, and DQ bits on data bus lines 132 are set so that the first half of the bits are set high and the second half of the bits are set low. If there are eight bits in the DQ byte then the pattern can be shown as 11110000. This encoding does not occur for any regular or masked data patterns.

If DBI-ac is enabled on interface 150, when host system 110 writes a masked data byte e.g. the byte, or plurality of data bits, in question will not be written to memory, a special encoding is used where indicator signal on indicator line 134 is enabled, set high, and DQ bits on data bus lines 132 are set such that the second half of the bits are switched from their previous value. For example, if there are eight bits in the DQ byte then the pattern can be shown as 11110000 which is generated by exclusive ORing the previous DQ data on data bus lines 132 with the current DQ data on data bus lines 132. This encoding does not occur for any regular or masked data patterns.

While this encoding allows that each byte may be individually poisoned, in another embodiment, if any byte in a read or write is poisoned, then the data in the entire read or write transaction is considered poisoned.

Flowcharts

Figure 2:
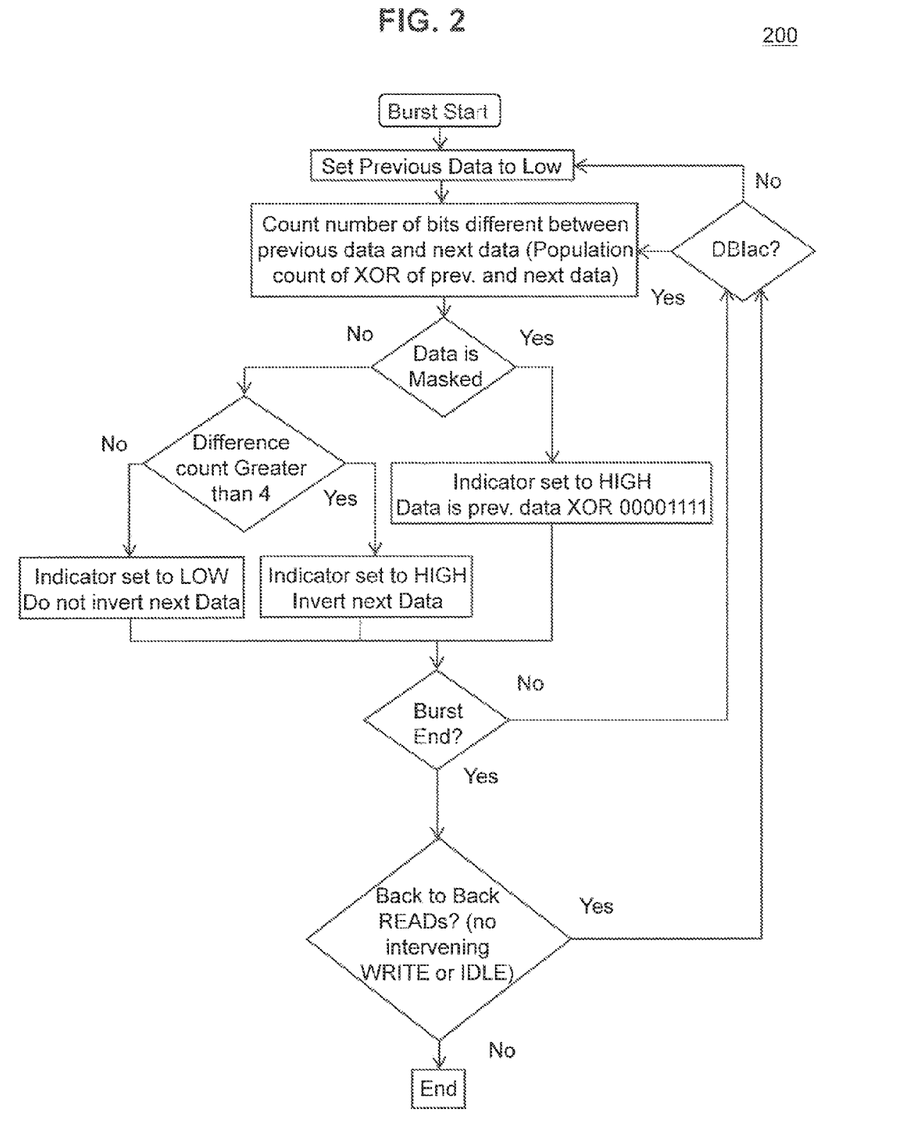
FIG. 2 is a flowchart for transmitting data with data base inversion enabled, according to an embodiment of the present invention.

FIG. 2 is a flowchart 200 for transmitting data with data base inversion enabled, e.g., by memory system 140 is response to a read command, according to an embodiment of the present invention. In an embodiment, between read commands, memory system 140 can tri-state the DQ and indicator signals, effectively holding the prior state. After issuing one or more read commands, prior to memory system 140 sending a write command or entering an idle state, memory system 140 drives the DQ data on data bus lines 132 and indicator signal on indicator line 134 low. In an embodiment, this driving the DQ data on data bus lines 132 and indicator signal on indicator line 134 low can occur over two half-clock periods in order to ensure that no more than five data signals, in a group of eight data signals will switch in any transition, thus conserving power and minimizing noise.

When memory system 140 is driving the signals due to a write command, the DBI behavior is similar. Between write commands, memory system 140 will hold the DQ and indicator signals. After issuing one or more write commands, prior to memory system 140 sending a read command or entering an idle state, memory system 140 will drive the DQ and indicator signals low over a two clock window.

Flowchart 200 starts with a burst of data, setting the previous DQ byte to low. The next data DQ byte is compared to the previous DQ byte to count the number of bits that are different. Next, it is determined whether or not the data has been deemed to be masked. If the data is masked then the indicator signal is enabled, set to high. Further, the DQ signals are in a "do not care" state and the data is set such that the first half of the plurality of data bits is set low and the second half is set high. If the data is not masked, then the count of different bits is analyzed. If the count is greater than 50% of the number of bits in the DQ byte (the flowchart uses the example where the DQ, byte consists of eight bits), then the indicator signal is set to high and the nest data is inverted. If the count is less than 50% of the number of bits in the DQ byte, then the indicator signal is set to low and the next data is not inverted.

The flowchart continues by checking if the burst has ended, if not, then the process is repeated with the choice of whether the system is utilizing DBI-ac or DBI-dc. If DBI-ac is being used then flowchart continues by counting the number of different bits between the previous data and the next data. If DBI-dc is being used the previous data is first set to low, and then the number of different bits are counted between the previous data and the next data.

The flowchart continues by checking if back to back reads have been encountered. If so, then the flowchart continues by checking if DBI-ac or DBI-dc is used and repeats the process. If there are no back to back reads the flowchart ends.

Figure 3:
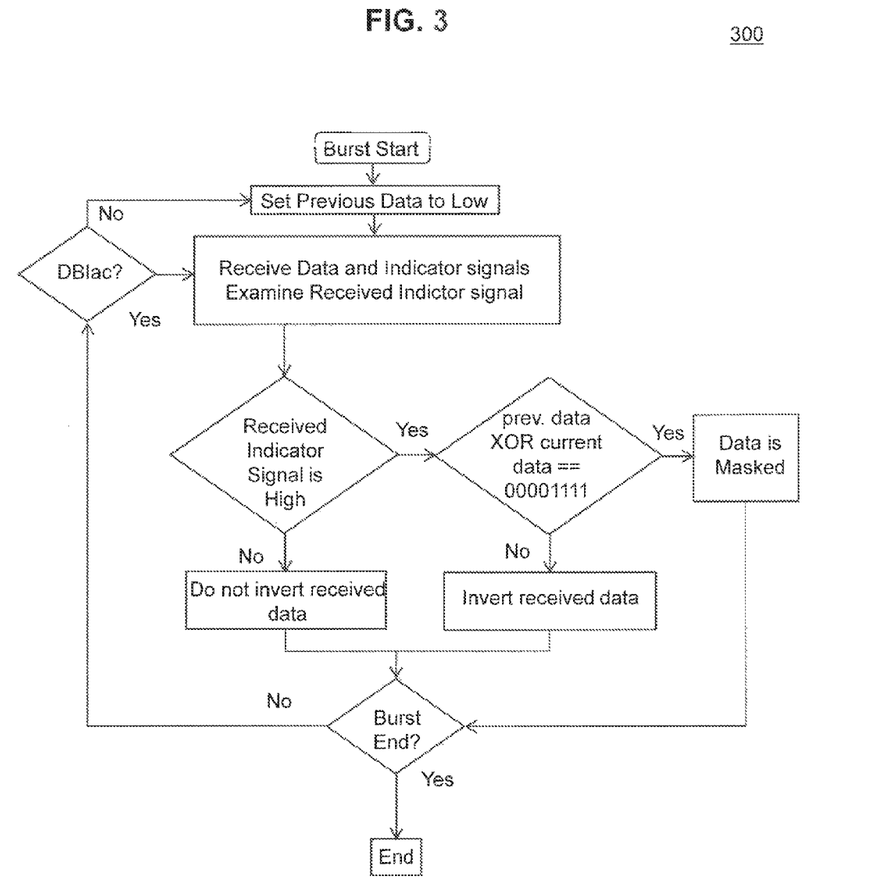
FIG. 3 is a flowchart for receiving data with data base inversion enabled, according to an embodiment of the present invention.

FIG. 3 is a flowchart 300 for determining the correct data by a receiver, e.g., by memory systems 140 receiving data for a write command, according to an embodiment of the present invention.

Flowchart 300 starts with a burst of data, setting the previous DQ byte to low. A data DQ byte and associated indicator signal are received and examined. The flowchart first determines if the indicator signal is high. If the indicator signal is low then the received data is not inverted.

In an embodiment, if the indicator signal is high then the previously received data is exclusively °Wed with the current data to determine if the first half of the DQ byte is low and the second half of the DQ byte is set high. If it is not, then this indicates that the data is not masked, but that it should be inverted. If the data pattern does match a "masked" pattern, e.g., where the first half of the DQ byte is low and the second half of the DQ byte is high, then the data is masked.

In an embodiment, the data pattern indicating that the plurality of data bits is masked can be any predefined pattern, not just the example given above where the first half of the bits are low and the second half are high. For example, the pattern of the plurality of data bits indicating that the bits are masked could consist of a subset of the plurality of data bits where at least one-half of the subset are set to an active state. For example, data masking could be signaled where there are a certain number of bits that are set, e.g., exactly four bits are set, indicating that the plurality of data bits are masked. In another embodiment, a pattern such as 0000111100001111 would indicate that the plurality of data bits are masked.

In any case, the next step in the flowchart is to determine if the burst has ended, if it has then the flowchart also concludes. If the burst has not ended then the process continues with the next DQ byte.

Figure 4:
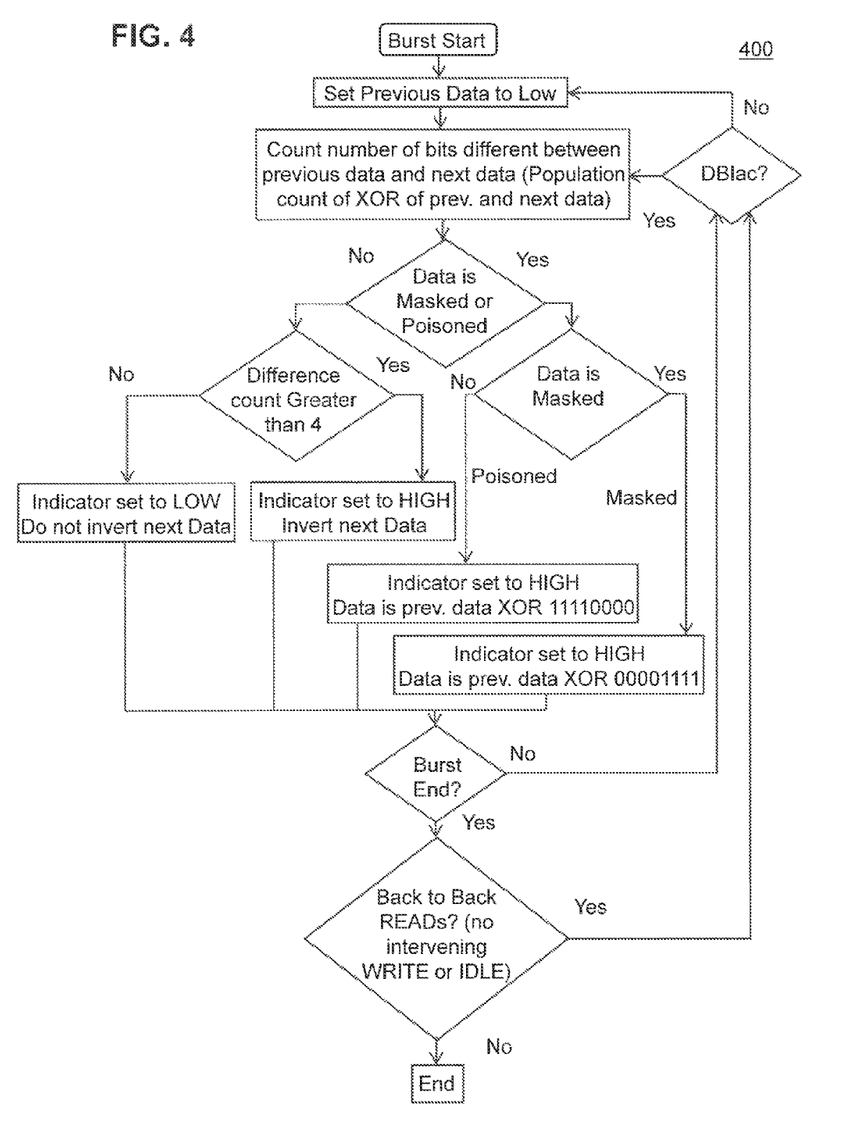
FIG. 4 is a flowchart for transmitting data with data base inversion and data poisoning support enabled, according to an embodiment of the present invention.
Figure 5:
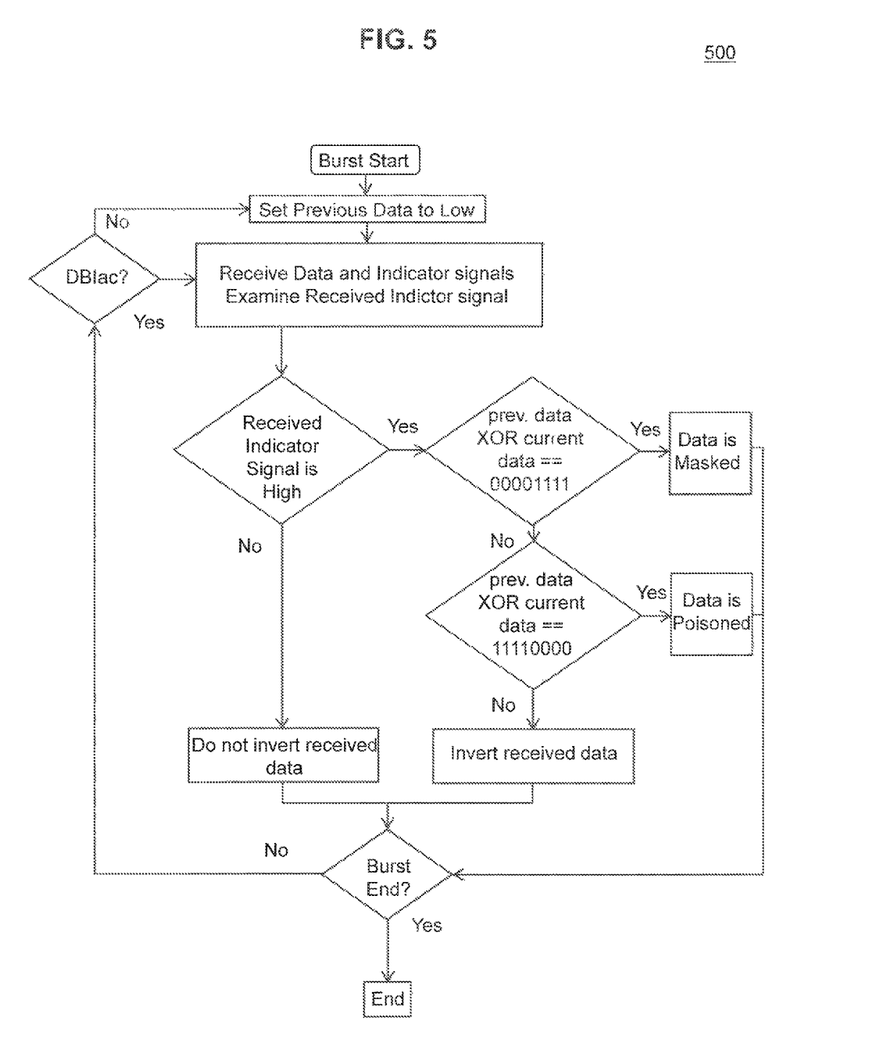
FIG. 5 is a flowchart for receiving data with data base inversion and poisoning support enabled, according to an embodiment of the present invention.

FIG. 4 and FIG. 5 are flowcharts that also include the ability to generate and analyze the indicator signal in conjunction with the DQ byte to determine if the DQ data is poisoned.

FIG. 4 is a flowchart 400 for performing DBI where data poisoning support is enabled for data being transmitted, e.g., by memory systems 140 is response to a read command, according to an embodiment of the present invention. In an embodiment, between read commands, memory system 140 can tri-state the DQ and indicator signals, effectively holding the prior state. After issuing one or more read commands, prior to memory system 140 sending a write command or entering an idle state, memory system 140 drives the DQ data on data bus lines 132 and indicator signal on indicator line 1.34 low. In an embodiment, this driving the DQ data on data bus lines 132 and indicator signal on indicator line 134 low can occur over two half-clock periods in order to ensure that no more than five data signals, in a group of eight data signals will switch in any transition, thus conserving power and minimizing noise.

When memory system 140 is driving the signals due to a write command, the DBI behavior is similar. Between write commands, memory system 140 will hold the DQ and indicator signals. After issuing one or more write commands, prior to memory system 140 sending a read command or entering an idle state, memory system 140 will drive the DQ and indicator signals low over a two clock window.

Flowchart 400 starts with a burst of data, setting the previous DQ byte to low. The next data DQ byte is compared to the previous DQ byte to count the number of bits that are different. Next, it is determined whether or not the data has been deemed to be masked or poisoned. If the data is not masked or poisoned, then the count of different bits is analyzed. If the count is greater than 50% of the number of bits in the DQ byte (the flowchart uses the example where the DQ byte consists of eight bits), then the indicator signal is set to high and the nest data is inverted. If the count is less than 50% of the number of bits in the DQ byte, then the indicator signal is set to low and the next data is not inverted.

If the data is masked or poisoned then the indicator signal is enabled, set to high. Further, the DQ signals are in a "do not care" state but are patterned according to whether the DQ byte is determined to be masked or poisoned. In an embodiment, if the data is masked then the first half of the DQ byte is set low and the second half is set high (the flowchart illustrates an eight bit example where the DQ byte pattern would be 00001111). If the data is poisoned then the first half of the DQ byte is set high and the second half is set low (the flowchart illustrates an eight bit example where the DQ byte pattern would be 11110000).

As with the pattern indicating that the data bits are masked, data poisoning can be signaled by any predefined pattern, not just the example given above where the first half of the bits are high and the second half are low. For example, the pattern of the plurality of data bits indicating that the bits are poisoned could consist of where at least one-half of the plurality of data bits are set that are not in a subset of the plurality of data bits that indicate that the plurality of data bits is masked. In another example, data poisoning could be signaled where there are a certain number of bits that are set, e.g., exactly five bits are set, indicating that the plurality of data bits are poisoned. In another embodiment, a pattern such as 1111000011110000 would indicate that the plurality of data bits are poisoned.

The flowchart continues by checking if the burst has ended, if not, then the process is repeated with the choice of whether the system is utilizing DBI-ac or DBI-dc. If DBI-ac is being used then flowchart continues by counting the number of different bits between the previous data and the next data. If DBI-dc is being used the previous data is first set to low, and then the number of different bits are counted between the previous data and the next data.

The flowchart continues by checking if back to back reads have been encountered. If so, then the flowchart continues by checking if DBI-ac or DBI-dc is used and repeats the process. If there are no back to back reads the flowchart ends.

FIG. 5 is a flowchart 500 for determining the correct data by a receiver, e.g., by memory systems 140 receiving data for a write command where data poisoning support is enabled, according to an embodiment of the present invention.

Flowchart 500 starts with a burst of data, setting the previous DQ byte to low. A data DQ byte and associated indicator signal are received and examined. The flowchart first determines if the indicator signal is high. If the indicator signal is low then the received data is not inverted.

If the indicator signal is high then the previously received data is exclusively OR'ed with the current data to determine the resulting data pattern. If the first half of the DQ byte is low and the second half of the DQ byte is set high (illustrated in the flowchart of FIG. 5 with an 8 bit DQ byte where the pattern is 00001111). If the pattern matches then that indicates that the DQ byte is masked.

If the first half of the DQ byte is high and the second half of the DQ byte is low (illustrated in the flowchart of FIG. 5 with an 8 bit DQ byte where the pattern is 11110000), then the indication is that the DQ byte is poisoned.

If the pattern does not match that of being masked or poisoned, then the current data should be inverted.

In any case the next step in the flowchart is to determine if the burst has ended, if it has the flowchart also concludes. If the burst has not ended then the process continues with the next DQ byte.

Methods

Methods in accordance with embodiments will be described with respect to the unified data masking, data poisoning, and data bus inversion signaling described in FIGS. 1-5, without limitation.

Figure 6:
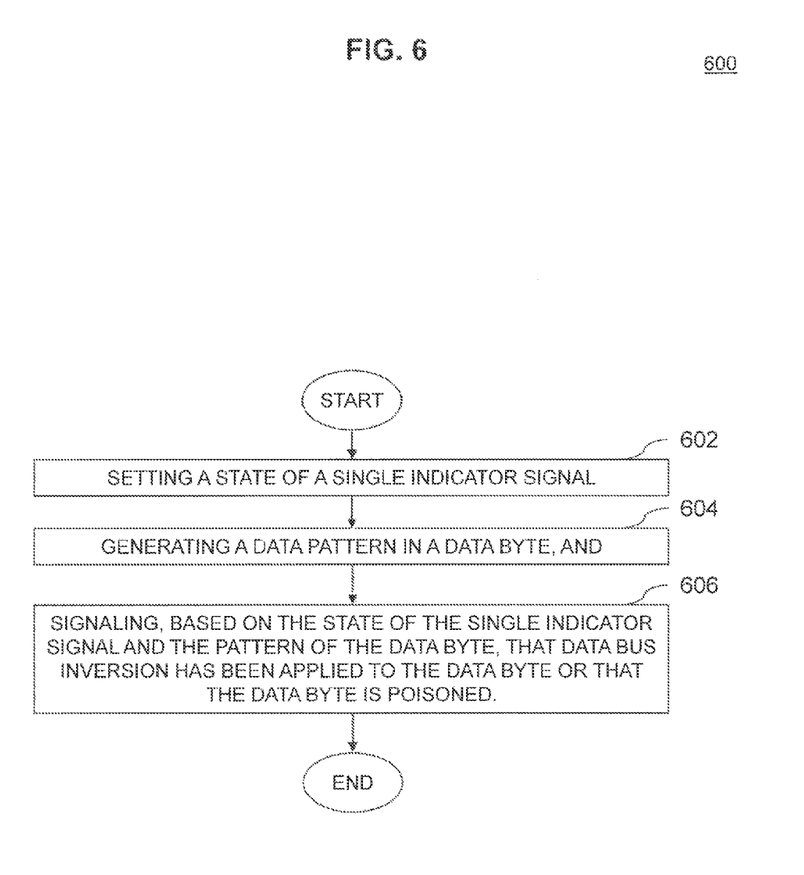
FIG. 6 is a method flowchart for transmitting unified signals, according to an embodiment of the present invention.

FIG. 6 is a flowchart of an exemplary method 600 for the generation of unified signaling. For ease of explanation, method 600 is described with respect to the unified signaling system of FIG. 1 using the methodology described in FIGS. 2-5, but embodiments of the method are not limited thereto.

Method 600 begins at step 602 with the setting a state of a single indicator signal. As discussed in regards to FIG. 4, the indicator signal is set low to indicate that the next data is not to be inverted. The indicator signal is set high to indicate that either the next data is to be inverted, or that the plurality of data bits is masked or poisoned.

The method continues at step 604 with the generating of a data pattern in a plurality of data bits. When the indicator signal is set high the method also relies on the pattern of the plurality of data bits to discern whether the plurality of data bits is masked or poisoned. If the data pattern is such that the first half of the plurality of data bits is set high and the second half is set low, then the plurality of data bits is considered poisoned. If the first half of the plurality of data bits is set low and the second half is set high, then the plurality of data bits is considered masked.

The method continues at step 606 by signaling, based on the state of the single indicator signal and the pattern of the plurality of data bits, that data bus inversion has been applied to the plurality of data bits or that the plurality of data bits is poisoned. This step decodes the pattern of the plurality of data bits in conjunction with the state of the indicator signal to indicate the status of the plurality of data bits.

Figure 7:
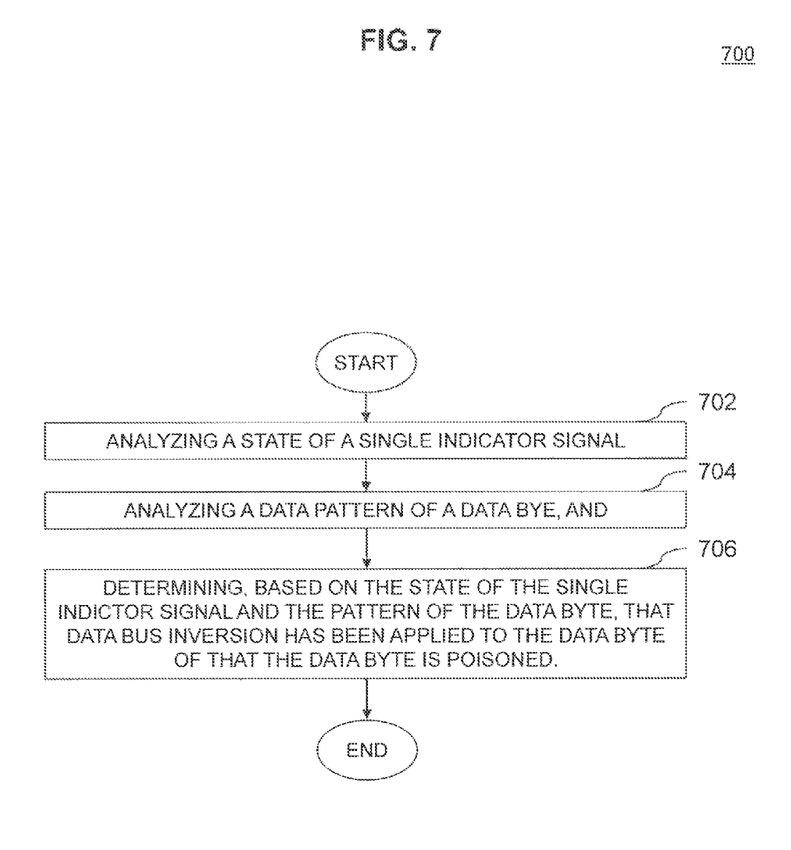
FIG. 7 is a method flowchart for receiving and analyzing unified signals, according to an embodiment of the present invention.

FIG. 7 is a flowchart of an exemplary method. 700 for the receiving and analyzing of unified signaling. For ease of explanation, method 700 is described with respect to the unified signaling system of FIG. 1 using the methodology described in FIGS. 2-5, but embodiments of the method are not limited thereto.

Method 700 begins at step 702 with the analyzing a state of a single indicator signal. As discussed in regards to FIG. 4, when the indicator signal is low the next data is not inverted. When the indicator signal is set high the next data is inverted, masked or poisoned.

The method continues at step 704 with the analyzing of a data pattern in a plurality of data bits. When the indicator signal is set high the method also relies on the pattern of the plurality of data bits to discern whether the plurality of data bits is masked or poisoned. If the data pattern is such that the first half of the plurality of data bits is set high and the second half is set low, then the plurality of data bits is considered poisoned. If the first half of the plurality of data bits is set low and the second half is set high, then the plurality of data bits is considered masked.

The method continues at step 706 by determining, based on the state of the single indicator signal and the pattern of the plurality of data bits, that data bus inversion has been applied to the plurality of data bits or that the plurality of data bits is poisoned. This step decodes the pattern of the plurality of data bits in conjunction with the state of the indicator signal to indicate the status of the plurality of data bits.

CONCLUSION

The Summary and Abstract sections may set forth one or more but not all exemplary embodiments of the present invention as contemplated by the inventor(s), and thus, are not intended to limit the present invention and the appended claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill, of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of providing unified data signaling, comprising:
   transmitting a single indicator and plurality of data bits indicating whether the plurality of bits is poisoned, masked, or neither, wherein:
   when the plurality of data bits is poisoned,
      generating a first data bit pattern; and
      setting a state of a single indicator signal to a HIGH state;
   when the plurality of data bits is masked,
      generating a second data bit pattern; and
      setting the state of the single indicator signal to a HIGH state; and
   when the plurality of data bits is not masked and not poisoned, determining whether to apply data bus inversion to the plurality of data bits.

2. The method of claim 1, wherein the second data bit pattern comprises at least one-half of the plurality of data bits set to a HIGH state, or changed to a different value from a previous plurality of data bits.

3. The method of claim 2,
   wherein the first data bit pattern comprises at least one-half of the plurality of data bits set to a HIGH state, or changed to a different value from the previous plurality of data bits, that are not the same as the second data bit pattern.

4. The method of claim 1, wherein when the data bus inversion is to be applied to the plurality of data bits, the method further comprises:
setting the state of the single indicator signal to a HIGH state; and
applying the data bus inversion to the plurality of data bits, wherein a resulting data bit pattern is different than the first and second data bit patterns.

5. The method of claim 1, further comprising:
setting the state of the single indicator signal to a LOW state when the data bus inversion has been disabled and the plurality of data bits is not masked or poisoned.

6. The method of claim 1, wherein the first data bit pattern indicating that the plurality of data bits is poisoned does not occur in any unmasked data patterns.

7. A method of receiving unified data signaling, comprising:
receiving a single indicator and plurality of data bits;
analyzing a state of the single indicator signal;
analyzing a data bit pattern of the plurality of data bits; and
determining, based on the state of the single indicator signal and the data bit pattern, that the plurality of data bits is poisoned, masked, or neither.

8. The method of claim 7, further comprising:
determining that the plurality of data bits is masked when the state of the single indicator signal is in a HIGH state, and at least one-half of the plurality of data bits of the data bit pattern are in a HIGH state, or changed to a different value from a previous data bit pattern.

9. The method of claim 8, further comprising:
determining that the plurality of data bits is poisoned when the state of the single indicator signal is in a HIGH state, at least one-half of the plurality of data bits are in a HIGH state or changed to a different value from the previous data bit pattern, and the plurality of data bits are not masked.

10. The method of claim 7, further comprising:
determining that data bus inversion has been applied to the plurality of data bits when the state of the single indicator signal is set to a HIGH state, and the plurality of data bits are not masked or poisoned.

11. The method of claim 7, further comprising:
determining when the state of the single indicator signal is set to a LOW state, that the data bus inversion has been disabled and that the plurality of data bits is not masked or poisoned.

12. A system for providing unified data signaling, comprising:
a memory device; and
a processing unit coupled to the memory device and configured to:
transmit a single indicator and plurality of data bits indicating whether the plurality of bits is poisoned, masked, or neither, wherein:
when a plurality of data bits is poisoned,
generate a first data bit pattern; and
set a state of a single indicator signal to a HIGH state;
when the plurality of data bits is masked,
generate a second data bit pattern; and
set the state of the single indicator signal to a HIGH state; and
when the plurality of data bits is not masked and not poisoned, determine whether to apply data, bus inversion to the plurality of data bits.

13. The system of claim 12, wherein the processing unit is configured to set the state of the single indicator signal to a LOW state when the data bus inversion has been disabled and the plurality of data bits is not masked or poisoned.

14. A system for receiving unified data signaling, comprising:
a memory device; and
a processing unit coupled to the memory device and configured to:
receive a single indicator and plurality of data bits;
analyze a state of the single indicator signal;
analyze a data bit pattern of the plurality of data bits; and
determine, based on the state of the single indicator signal and the data bit pattern, that the plurality of data bits is poisoned, masked, or neither.

15. The system of claim 14, wherein the processing unit is configured to:
determine, when the state of the single indicator signal is set to a LOW state, that the data bus inversion has been disabled and that the plurality of data bits is not masked or poisoned.

16. A computer program product comprising at least one non-transitory computer readable storage medium encoding instructions thereon that, in response to execution by a computing device, cause the computing device to perform operations comprising:
transmitting a single indicator and plurality of data bits indicating whether the plurality of bits is poisoned, masked, or neither, wherein:
when a plurality of data bits is poisoned,
generating a first data bit pattern; and
setting a state of a single indicator signal to a HIGH state;
when the plurality of data bits is masked,
generating a second data bit pattern; and
setting the state of the single indicator signal to a HIGH state; and
when the plurality of data bits is not masked and not poisoned, determining whether to apply data bus inversion to the plurality of data bits.

* * * * *